United States Patent
Blunier et al.

(10) Patent No.: US 11,696,523 B2
(45) Date of Patent: Jul. 11, 2023

(54) SYSTEM AND METHOD FOR HYDRAULICALLY LEVELING A MULTI-WING AGRICULTURAL IMPLEMENT

(71) Applicant: CNH Industrial America LLC, New Holland, PA (US)

(72) Inventors: Timothy R. Blunier, Danvers, IL (US); Jared Paul Schaffer, Normal, IL (US)

(73) Assignee: CNH Industrial America LLC, New Holland, PA (US)

( * ) Notice: Subject to any disclaimer, the term of this patent is extended or adjusted under 35 U.S.C. 154(b) by 990 days.

(21) Appl. No.: 16/247,241

(22) Filed: Jan. 14, 2019

(65) Prior Publication Data

US 2020/0221628 A1     Jul. 16, 2020

(51) Int. Cl.
*A01B 63/14* (2006.01)
*A01B 73/04* (2006.01)

(52) U.S. Cl.
CPC ............ *A01B 63/14* (2013.01); *A01B 73/046* (2013.01)

(58) Field of Classification Search
CPC ...... A01B 63/14; A01B 73/046; A01B 73/044
See application file for complete search history.

(56) References Cited

U.S. PATENT DOCUMENTS

| | | | |
|---|---|---|---|
| 4,151,886 A * | 5/1979 | Boetto et al. ......... | A01B 73/02 172/311 |
| 4,967,851 A | 11/1990 | Barber | |
| 5,687,798 A * | 11/1997 | Henry et al. ......... | A01B 73/044 172/311 |
| 6,089,329 A | 7/2000 | Smith | |
| 7,918,285 B1 | 4/2011 | Graham et al. | |
| 8,522,889 B2 | 9/2013 | Adams et al. | |
| 8,776,908 B2 | 7/2014 | Maro et al. | |
| 8,794,344 B2 | 8/2014 | Blunier et al. | |
| 9,288,937 B2 | 3/2016 | Sauder | |
| 9,301,439 B2 | 4/2016 | Gilstring | |
| 9,609,800 B2 | 4/2017 | Henry | |
| 9,713,299 B2 | 7/2017 | Blunier et al. | |

(Continued)

FOREIGN PATENT DOCUMENTS

WO    WO2017127518    7/2017

*Primary Examiner* — Thomas B Will
*Assistant Examiner* — Joel F. Mitchell
(74) *Attorney, Agent, or Firm* — Rebecca Henkel; Rickard DeMille

(57) ABSTRACT

A system for hydraulically leveling a multi-wing agricultural implement having a pressure regulating valve and a folding valve fluidly coupled in parallel between a supply line, configured to provide a supply pressure of hydraulic fluid, and an actuator, configured to move an outer-wing section of the implement between a transport position and a fully-extended position. Specifically, when fluid is supplied to the actuator via the pressure regulating valve, only a portion of the supply pressure is allowed through the pressure regulating valve to the actuator such that the outer-wing section may pivot towards a position where the outer-wing section is substantially level with the inner-wing section. When hydraulic fluid is supplied to the actuator via the folding valve, the outer-wing section is actuated towards the transport position. When hydraulic fluid is supplied to the actuator via the leveling valve, the outer-wing section is leveled relative to the inner-wing section.

20 Claims, 6 Drawing Sheets

(56) References Cited

U.S. PATENT DOCUMENTS

| | | |
|---|---|---|
| 9,883,623 B2 | 2/2018 | Koch |
| 9,918,424 B2 | 3/2018 | Blunier et al. |
| 10,045,474 B2 | 8/2018 | Bachman et al. |
| 10,278,323 B2 * | 5/2019 | Hadley et al. ....... A01B 73/046 |
| 2013/0032363 A1 | 2/2013 | Curry et al. |
| 2017/0118901 A1 | 5/2017 | Stark |
| 2018/0184573 A1 * | 7/2018 | Hadley et al. ....... A01B 73/046 |

* cited by examiner

SYSTEM AND METHOD FOR HYDRAULICALLY LEVELING A MULTI-WING AGRICULTURAL IMPLEMENT

FIELD OF THE INVENTION

The present subject matter relates generally to agricultural implements, and more particularly, to systems and methods for hydraulically leveling a multi-wing agricultural implement.

BACKGROUND OF THE INVENTION

A wide range of farm implements have been developed and are presently in use for tilling, planting, harvesting, and so forth. Tillers, for example, are commonly towed behind tractors and may cover wide swaths of ground to be prepared for planting. To make the tilling operation as efficient as possible, very wide swaths may be covered by extending wing assemblies on either side of a central frame section of the implement being pulled by the tractor. Typically, the central frame section and the wing assemblies include one or more toolbars, various ground-engaging tools mounted on the toolbar(s), and one or more associated support wheels. The wing assemblies are commonly disposed in a "floating" arrangement during the tilling operation, wherein hydraulic cylinders allow the tools to contact the soil with sufficient force to open the soil. For transport, the wing assemblies are elevated by the support wheels to disengage the ground-engaging tools from the ground and may optionally be folded, stacked, and/or pivoted to reduce the width of the implement.

To transition the wing assemblies from a transport position to a fully-extended position, a wing movement operation is performed in which the assemblies are moved via control of the operation of the associated hydraulic cylinders to allow the wing assemblies to be unfolded relative to the central frame section of the implement and subsequently lowered relative to the ground. A reverse operation may be performed to transition the wing assemblies from the fully-extended position to the transport position in which the wing assemblies are raised relative to the ground and subsequently folded towards the central frame section of the implement.

In certain instances, the loads acting on the wing sections of an agricultural implement during the performance of an agricultural operation (e.g., a tilling operation) cause the wing sections to become out-of-level, thereby resulting in uneven penetration depths across the width of the implement. For example, with a multi-wing implement, the loads acting on the outer-wing sections cause the outer ends of such sections to drop down lower relative to the ground, thereby causing outer-wing sections to be angled upwardly towards the pivot joints defined between the outer-wing and inner-wing sections. This problem has been previously addressed by adjusting wheel positions or by individually adjusting the ground engaging tools attached to such outer-wings to better engage the ground. However, such adjustments are time consuming and may need to be repeated multiple times throughout a working operation.

Accordingly, an improved system and related method for hydraulically leveling a multi-wing agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one embodiment, the present subject matter is directed to a system for hydraulically leveling a multi-wing agricultural implement. The system includes a central frame section, an inner-wing section pivotally coupled to the central frame section, an outer-wing section pivotally coupled to the inner-wing section, and an actuator coupled between the inner-wing section and the outer-wing section. The system may further include a valve assembly configured to provide hydraulic fluid at a supply pressure to a supply line, a leveling valve fluidly coupled between the supply line and the actuator, and a folding valve fluidly coupled in parallel with the pressure regulating valve between the supply line and the actuator. The actuator is configured to actuate the outer-wing section between a transport position and a fully-opened position. The folding valve, when in an opened position, allows the hydraulic fluid to be supplied to the actuator such that the outer-wing section is actuated relative to the inner-wing section towards the transport position. Additionally, when the folding valve is in a closed position and the hydraulic fluid is being supplied through the supply line, the leveling valve is configured to allow the hydraulic fluid to be directed to the actuator at a selected leveling pressure less than the supply pressure to maintain the outer-wing section at a desired orientation relative to the inner-wing section.

In another embodiment, the present subject matter is directed to a method for hydraulically leveling a multi-wing agricultural implement. The multi-wing agricultural implement has a central frame section, an inner-wing section pivotally coupled to the central frame section, an outer-wing section pivotally coupled to the inner-wing section, and an actuator coupled between the inner-wing section and the outer-wing section. A supply line of the agricultural implement being in fluid communication with a valve assembly configured to provide hydraulic fluid at a supply pressure to the supply line, the implement further including a leveling valve fluidly coupled between the supply line and the actuator, and a folding valve fluidly coupled in parallel with the leveling valve between the supply line and the actuator. The method includes receiving, with a computing device, an input indicative of an orientation of the outer-wing section relative to the inner-wing section or associated with adjusting the orientation of the outer-wing section relative to the inner-wing section. Additionally, the method further includes, while the folding valve is in a closed position, controlling, with the computing device, an operation of the valve assembly to direct hydraulic fluid through the supply line to the leveling valve to allow the hydraulic fluid to be supplied to the actuator at a selected leveling pressure less than the supply pressure in order to actuate the outer-wing section into a desired orientation relative to the inner-wing section.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
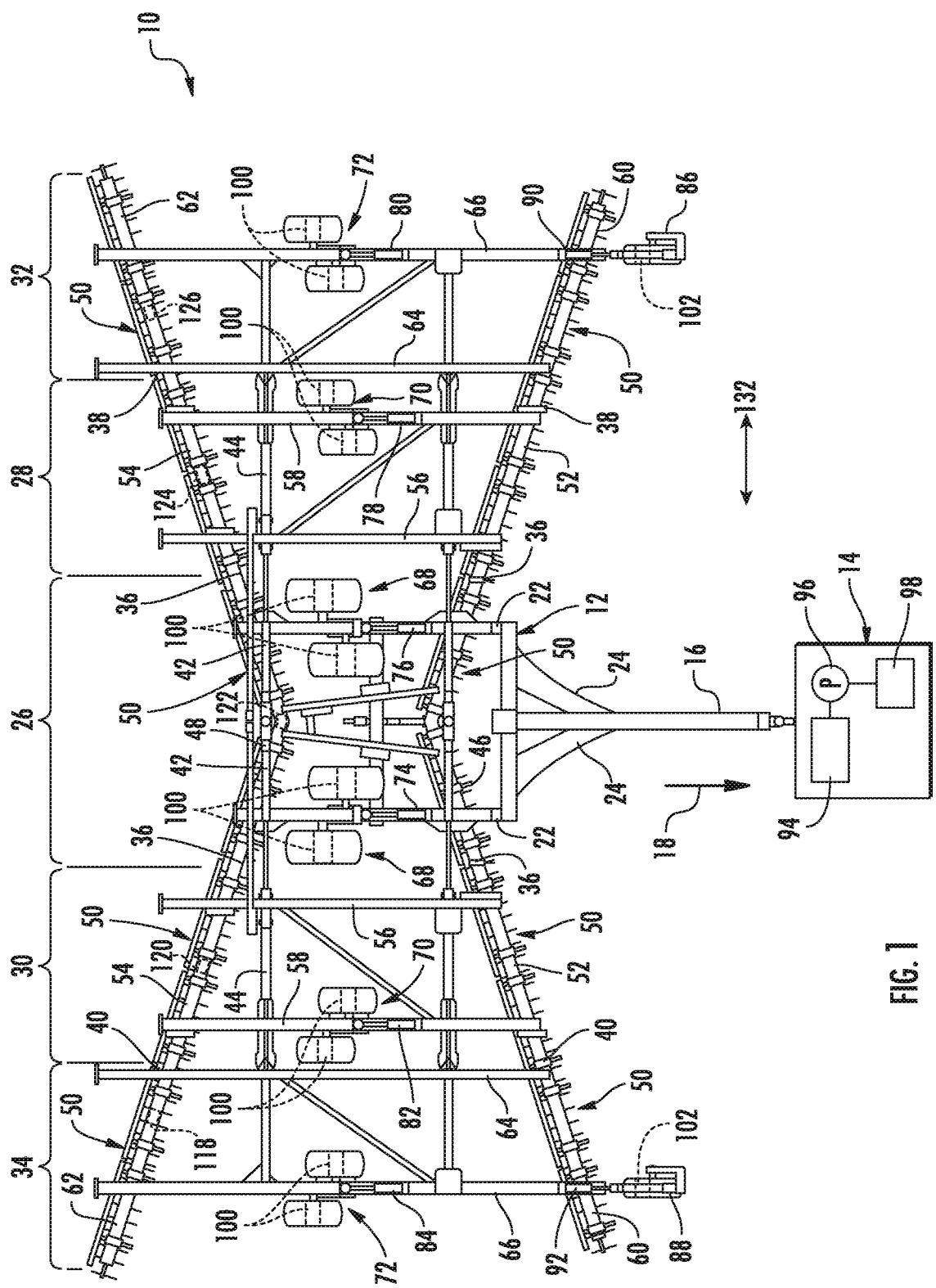
FIG. 1 illustrates a top view of one embodiment of a multi-wing agricultural implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for hydraulically leveling a multi-wing agricultural implement. Specifically, in several embodiments, the agricultural implement may include a central frame section, an inner-wing section pivotally coupled to each side of the central frame section, and an outer-wing section pivotally coupled to each inner-wing section. In addition, the implement may be provided in operative association with a hydraulic system including an actuator (e.g., hydraulic cylinder) coupled between each inner-wing section and the adjacent outer-wing section to allow the outer-wing section to be pivoted or folded related to the associated inner-wing section between a transport position and a fully-opened (or floating) position. Moreover, in accordance with aspects of the present subject matter, the actuator may also be utilized to adjust the orientation of the outer-wing section relative to the inner-wing section to obtain a more level profile across the width of the implement as the implement is being used to perform an agricultural operation.

To allow for such adjustments in the widthwise levelness of the implement, the hydraulic system may, in several embodiments, include both a folding valve and a separate leveling valve in fluid communication with the actuator controlling the orientation of each outer-wing section relative to the adjacent inner-wing section. For example, the folding valve and separate leveling valve may be coupled in parallel between the source of pressurized hydraulic fluid and the respective actuator. In such embodiments, when it is desired to fold the outer-wing section relative to the adjacent inner-wing section, the folding valve may be opened to allow pressurized hydraulic fluid to be supplied to the actuator. In contrast, when it is desired to adjust the relative orientation of the outer-wing section relative to the inner-wing section during operation of the implement, the folding valve may be closed, thereby allowing the supply of hydraulic fluid to the actuator to be regulated by the leveling valve. In this regard, the leveling valve may, for example, correspond to a pressure regulating valve that is configured to reduce the pressure of the hydraulic fluid to a selected leveling pressure adapted to adjust the orientation of the outer-wing section to the desired orientation (e.g., where the outer-wing section is substantially level with the inner-wing section) and subsequently maintain the outer-wing section at such orientation relative to the inner-wing section.

In particular embodiments of the present subject matter, a controller of the disclosed system may be configured to control the operation of the folding valve to open or close and optionally to control the operation of the leveling valve so as to maintain the outer-wing section in the desired orientation relative to the inner-wing section. Additionally, in some embodiments, one or more sensors may be installed on the implement to measure the angular position of the outer-wing section, the inner-wing section, and/or the relative angular position of the outer-wing section relative to the inner-wing section. In such embodiments, the controller may be configured to monitor the measurements provided by the one or more sensors and control the operation of the leveling valve based on the feedback from the sensors in order adjust the orientation of the outer-wing section to the desired orientation. In other embodiments, the controller may be configured to control the operation of the leveling valve based on an input received from an operator, such as an input requesting that the orientation of the outer-wing section relative to the inner-wing section be adjusted.

Referring now to FIG. 1, a top view of one embodiment of a multi-wing agricultural implement 10 is illustrated in accordance with aspects of the present subject matter. As shown, the implement 10 is configured as a multi-wing disc ripper. However, in other embodiments, the implement 10 may have any other suitable implement configuration, such as by being configured as any other suitable multi-wing implement, including any other suitable tillage implement (e.g., a cultivator) or other implement (e.g., a planter, seeder, sprayer, fertilizer, and/or the like).

As shown, the implement 10 includes a carriage frame assembly 12 configured to be towed by a work vehicle 14 (shown schematically in FIG. 1), such as a tractor. The carriage frame assembly 12 may generally include a pull hitch 16 extending in a forward travel direction 18 of the implement 10, and carrier frame members 22 which are coupled with and extend from the pull hitch 18. Additionally, reinforcing gusset plates 24 may be used to strengthen the connection between the pull hitch 18 and the carrier frame members 22.

As shown in FIG. 1, the tillage implement 10 is configured as a multi-section implement including a plurality of frame sections. Specifically, in the illustrated embodiment, the tillage implement 10 includes a central frame section 26, inner right and left wing frame sections 28, 30 pivotally coupled to the central frame section 26, and right and left outer-wing sections 32, 34 pivotally coupled to the respective right and left inner-wing sections 28, 30. For example, each of the inner-wing sections 28, 30 is pivotally coupled to the central frame section 26 at pivot joints 36. Similarly, the right outer-wing section 32 is pivotally coupled to the right inner-wing section 28 at pivot joints 38 while the left outer-wing section 34 is pivotally coupled to the left inner-wing section 30 at pivot joints 40. As is generally understood, the pivot joints 36, 38, 40 may be configured to allow relative pivotal motion between adjacent frame sections of the implement 10. For example, the pivot joints 36, 38, 40 may allow for articulation of the various frame sections between a fully-extended position, in which the frame sections are all intended to be disposed substantially in a common plane, and a transport position, in which the wing sections 28, 30, 32, 34 are folded upwardly to reduce the overall width of the implement 10.

Additionally, as shown in FIG. 1, the implement 10 may include inner-wing actuators 42 coupled between the central frame section 26 and the inner-wing sections 28, 30 to enable pivoting or folding between the fully-extended and transport positions. For example, by retracting/extending the inner-wing actuators 42, the inner-wing sections 28, 30 may be pivoted or folded relative to the central frame section 26 about the pivot joints 36. Moreover, the implement 10 may also include outer-wing actuators 44 coupled between each inner-wing section 28, 30 and its adjacent outer-wing section 32, 34. As such, by retracting/extending the outer-wing actuators 44, each outer-wing section 32, 34 may be pivoted or folded relative to its respective inner-wing section 28, 30. As will be discussed in greater detail below, the outer-wing actuators 44 may further be configured to adjust the relative orientation of each outer-wing section 32, 34 to its respective inner-wing section 28, 30 during operation of the implement 10.

Moreover, each of the frame sections may be configured to support one or more gangs of disc blades 50. In such an embodiment, the gangs of disc blades 50 may be resiliently connected to frame members 46, 48, 52, 54, 60, 62 of the frame sections in any suitable manner so as to provide smooth working of the soil. However, it should be appreciated that, in other embodiments, any other suitable ground-engaging tools may be supported by the various frame members, such as shanks, tines, rolling baskets, and/or the like.

In several embodiments, the various frame sections 26, 28, 30, 32, 34 of the tillage implement 10 may be configured to be positioned at variable positions relative to the soil in order to set the position of the gangs of disc blades 50 above the soil as well as the penetration depth of the disc blades 50. For example, in the illustrated embodiment, the tillage implement 10 includes center transport wheels 68 pivotally interconnected with the carrier frames 22 so that they provide support to the forward and aft frame members 46 and 48 relative to the soil. Similarly, inner-wing transport wheels 70 may be interconnected with the frame elements 58 to support and variably position the inner-wing sections 28, 30 relative to the soil. In addition, outer-wing transport wheels 72 may be pivotally mounted on the frame members 66 to support and variably position the outer-wing sections 32, 34 relative to the soil.

In such an embodiment, wheel actuators may also be provided in operative association with the various wheels to adjust the relative positioning between the frame sections and the soil. For instance, center wheel actuators 74, 76 may be utilized to manipulate the center transport wheels 68 to establish the distance of the central frame section 26 relative to the soil while inner-wing wheel actuators 78, 82 may be used to variably position the inner-wing sections 28, 30 relative to the soil. Similarly, outer-wing wheel actuators 80, 84 may be used to variably position the outer-wing sections 32, 34 relative to the soil.

It should be appreciated that the implement 10 may also include gauge wheels 86, 88 on the outer-wing sections 32, 34 to orient the fore-to-aft angle of the tillage implement 10 relative to the soil. In such an embodiment, gauge wheel actuators 90, 92 may be provided in operative association with the gauge wheels 86, 88 to allow the fore-to-aft angle of the implement 10 to be adjusted. As shown in FIG. 1, in one embodiment, the gauge wheels 86, 88 may correspond to the forward-most ground-engaging components of the implement 10.

It should be also appreciated that, in several embodiments, the various actuators described above may correspond to hydraulically-activated actuators, such as a hydraulic cylinder. In such embodiments, the flow of hydraulic fluid to the various actuators may be controlled, for example, via one or more vehicle-based valve assemblies 94 located on and/or within the work vehicle 14 configured to tow the implement 10. For instance, the work vehicle 14 may include a pump 96 configured to supply a flow of pressurized hydraulic fluid from a fluid supply 98 to valve assembly(ies) 94. The valve assemblies 94 may, in turn, be controlled so as to regulate the supply of hydraulic fluid to the various actuators on the implement 10. As will be described in greater detail below, the operation of the valve assembly(ies) 94 may be electronically controlled via one or more controllers of the disclosed system.

In some embodiments, the implement 10 may include one or more implement-based sensors mounted to or supported on the various frame sections 26, 28, 30, 32, 34 for monitoring the relative orientation, levelness and/or inclination of the frame sections. For instance, as shown in FIG. 1, a first level sensor 118 may be coupled to one of the frame members 60, 62 of the left outer-wing section 34, a second level sensor 120 may be coupled to one of the frame members 52, 54 of the left inner-wing section 30, a third level sensor 122 may be coupled to one of the frame members 46, 48 of the central frame section 26, a fourth level sensor 124 may be coupled to one of the frame members 52, 54 of the right inner-wing section 28, and a fifth level sensor 126 may be coupled to one of the frame members 60, 62 of the right outer-wing section 32. In such an embodiment, each level sensor 118, 120, 122, 124, 126 may be configured to output a signal or measurement indicative of the angle of inclination or "inclination angle" of its respective frame section 26, 28, 30, 32, 34. Such output signals from the sensors may then be transmitted to the system controller(s) for subsequent processing, analysis, and/or storage. For instance, based on the sensor data received from the implement-based level sensors, the controller(s) may be configured to independently monitor the inclination angle of each frame section. In such an embodiment, the controller(s) may, for example, utilize the inclination angle of the central frame section 26 as a reference value for determining the relative levelness or inclination of the various wing sections 28, 30, 32, 34 (e.g., by comparing the inclination angle of each wing section 28, 30, 32, 34 to the inclination angle of the central frame section 26, or by comparing the inclination angle of each wing section 28, 30, 32, 34 to the inclination angle of the adjacent wing or frame section 26, 28, 30, 32, 34).

It should be appreciated that, in one embodiment, each level sensor 118, 120, 122, 124, 126 may correspond to an inclinometer, such as a single axis inclinometer, a two-axis inclinometer, or a three-axis inclinometer. For instance, in one embodiment, each implement-based level sensor 118, 120, 122, 124, 126 may be configured to measure the side-to-side inclination (e.g., an implement roll angle) of its respective frame section in a side-to-side or "rolling" direction (indicated by arrow 132) extending perpendicular to the travel direction 18. In other embodiments, the level sensors 118, 120, 122, 124, 126 may correspond to any other suitable sensor(s) or sensing device(s) that may provide an indication of the angle of inclination of the implement's frame sections, such as gyroscopes, accelerometers, height sensors (e.g., radar or sonar sensors), and/or the like. Alternatively, in some embodiments, the sensors 118, 120, 122, 124, 126 may correspond to any other suitable sensor(s) or sensing device(s) that may provide a direct indication of the angle between adjacent frame or wing sections (e.g., roll sensors, rotary encoders or potentiometers, and/or the like).

It should be appreciated that the configuration of the implement 10 described above and shown in FIG. 1 is provided only to place the present subject matter in an exemplary field of use. Thus, it should be appreciated that the present subject matter may be readily adaptable to any manner of implement configuration. For example, in an alternative embodiment, the implement 10 may include three or more wing sections disposed along each side of the central frame section 26. Similarly, in another embodiment, any other suitable type of ground-engaging tool (or any combination of ground-engaging tools) may be coupled to or otherwise supported by the various frame sections 26, 28, 30, 32, 34 of the implement 10, including discs, shanks, tines, baskets, and/or the like.

Figure 2:
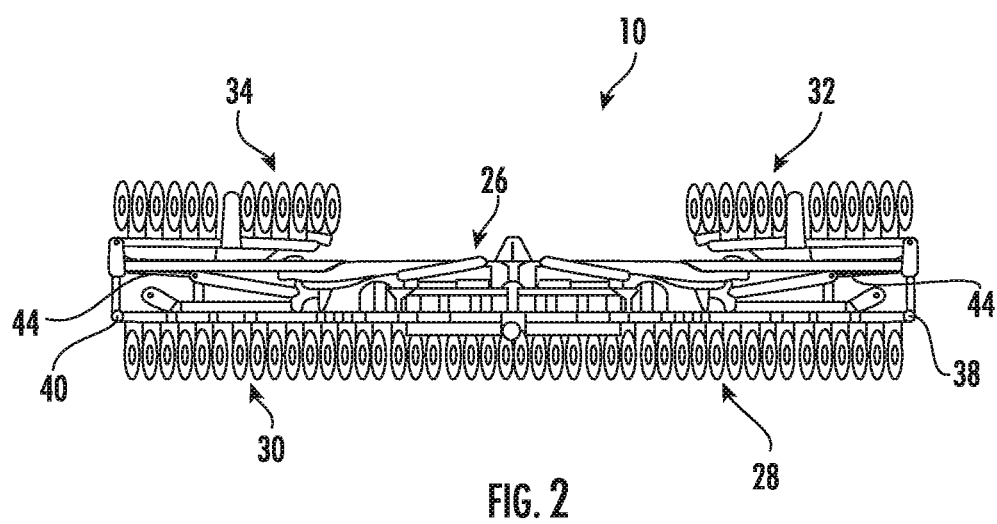
FIG. 2 illustrates a rear view of the multi-wing agricultural implement shown in FIG. 1, particularly illustrating the implement with its outer-wing sections folded inwardly to a transport position in accordance with aspects of the present subject matter.

Referring now to FIG. 2, a rear view of the embodiment of the implement 10 described above with reference to FIG. 1 is illustrated in accordance with aspects of the present subject matter. More particularly, FIG. 2 illustrates the outer-wing sections 32, 34 of the implement 10 after they have been pivoted from their fully-extended position into the transport position.

As shown in FIG. 2, the outer-wing actuators 44 positioned along the top-side of the implement 10 have been fully retracted such that each outer-wing section 32, 34 is pivoted or folded relative to its respective inner-wing section 28, 30 into the transport position. Alternatively, while not shown, it should be appreciated that the outer-wing actuators 44 may, instead, be positioned on a bottom-side of the implement 10, in which case the actuators 44 would need to be extended to pivot the outer-wing sections 32, 34 into the transport position. As will be described in further detail below, hydraulic fluid is supplied at a given rate and/or pressure to the outer-wing actuators 44 (e.g., at a maximum flow rate and/or a maximum pressure for the wing actuators 44) to actuate the outer-wing sections 32, 34 into the transport position. In the transport position, as shown in FIG. 2, the frame members 60, 62 (FIG. 1) of the outer-wing sections 32, 34 are generally parallel to the frame members 52, 54 (FIG. 1) of the respective inner-wing section 28, 30.

Figure 3A:
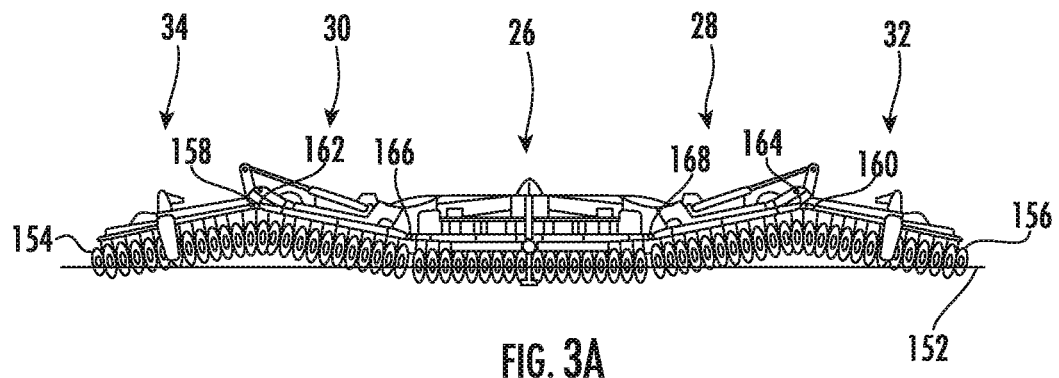
FIG. 3A illustrates another rear view of the implement shown in FIG. 1, particularly illustrating the outer-wing sections folded outwardly to their fully-extended position such that the outer-wing sections are out-of-level relative to the inner-wing sections of the implement.
Figure 3B:
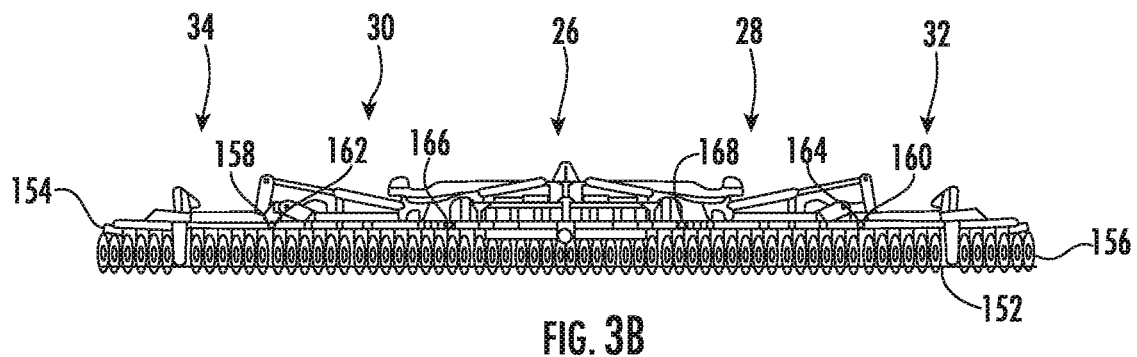
FIG. 3B illustrates yet another rear view of the implement shown in FIG. 1, particularly illustrating the outer-wing sections after they have been leveled relative to the inner-wing sections of the implement in accordance with aspects of the present subject matter.

Referring now to FIGS. 3A and 3B, a series of views in which a multi-wing agricultural implement is leveled are illustrated in accordance with aspects of the present subject matter. In general, it is typically desirable for an agricultural implement, such as the implement 10 described above with reference to FIGS. 1 and 2, to be configured such that, when the inner and outer wing sections 28, 30, 32, 34 are actuated to their fully-extended positions, the outer-wing sections 32, 34 are at a desired orientation relative to the inner-wing section (e.g., level with the inner-wing sections 28, 30, and preferably the central frame section 26, such that all of the ground-engaging tools 50 are held at substantially the same distance relative to, and therefore evenly engage, a ground surface 152). However, in some cases, when the outer-wing sections 32, 34 and/or the inner-wing sections 28, 30 are at the fully-extended position, they are not level with each other and/or with the central frame section 26. Therefore, a further leveling operation of at least the outer-wing section(s) 32, 34 is needed.

For example, referring specifically to FIG. 3A, a situation is shown in which the weight of the outer-wing sections 32, 34 has caused the outer-wing sections 32, 34 to "sag" or extend at an angle relative to the respective inner-wing sections 28, 30 when in the fully-extended position. More specifically, when the outer-wing sections 32, 34 are positioned at their fully-extended positions (e.g., when performing a tillage operation with the implement 10), the outermost ends 154, 156 of the outer-wing sections 32, 34 are positioned lowered relative to the ground surface 152 than the innermost ends 158, 160 of the outer-wing sections 32, 34 due to the weight of the outer-wing sections 32, 34. As such, the disc blades 50 along the outer-wing sections 32, 34 engage the ground surface 152 at different depths. Further, as shown in FIG. 3A, the inner-wing sections 28, 30 are pivoted by the outer-wing sections 32,34 such that the outermost ends 162, 164 of the inner-wing sections 28, 30 are positioned higher relative to the ground surface 152 than the innermost ends 166, 168 of the inner-wing sections 28, 30. Thus, the outer-wing sections 32, 34 are disposed at an angle relative to the inner-wing sections 28, 30, and the inner-wing sections 28, 30 are subsequently disposed at an angle relative to the central frame section 26, causing the ground surface 152 to be worked unevenly.

In accordance with aspects of the present subject matter, in order to overcome the uneven working of the ground surface 152 caused by the weight of the outer-wing sections 32, 34, it is beneficial to actuate the outer-wing sections 32, 34 at least partially towards their transport position. As a result of such actuation of the outer-wing sections 32, 34, some of the weight of the outer-wing sections 32, 34 may be shifted onto the respective inner-wing sections 28, 30 via the connection of the actuators 44 therebetween. As such, as shown in FIG. 3B, by partially retracting the outer-wing actuators 44 to move the outer-wing sections 32, 34 slightly towards their transport position, the inner wing sections 28, 30 are forced downward as the outer-wing sections 32, 34 are pivoted upward, thereby leveling the implement across its width. Once the outer-wing actuators 44 have moved the outer-wing sections 32, 34 slightly towards their transport position, all of the ground engaging tools 50 of the implement 10 engage the ground surface 152 substantially evenly or at the same depth. It should be appreciated that, as used herein, the outer-wing sections 32, 34 may, in several embodiments, be considered as being substantially aligned with the inner-wing sections 28, 30 when the frame members 60, 62 (FIG. 1) of the outer-wing sections 32, 34 are disposed at an angle relative to the frame members 52, 54 (FIG. 1) of the inner-wing sections 28, 30 in the side-to-side direction 132 of the implement 10 ranging from about 170 degrees to about 190 degrees, such as an angle ranging from about 175 degrees to about 185 degrees and/or any other subranges defined therebetween.

Figure 4:
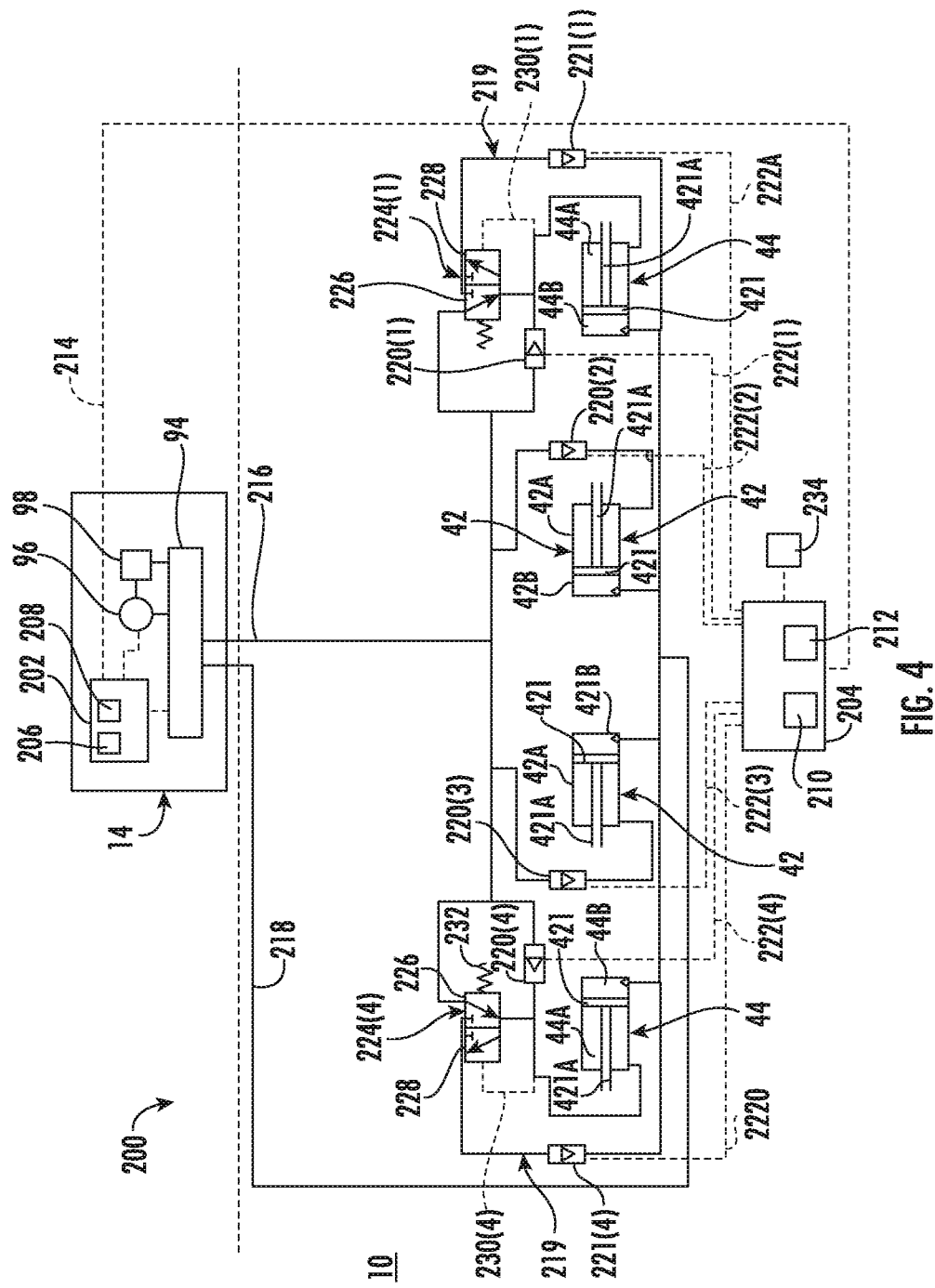
FIG. 4 illustrates a schematic view of one embodiment of a system for automatically leveling a multi-wing agricultural implement in accordance with aspects of the present subject matter.

Referring now to FIG. 4, a schematic view of one embodiment of a system 200 for hydraulically leveling a multi-wing agricultural implement is illustrated in accordance with aspects of the present subject matter. As will be described below, the system 200 allows for the outer-wing sections of an implement to be hydraulically actuated into a desired orientation relative to the inner-wing sections of such implement. For purposes of discussion, the system 200 will be described herein with reference to the implement 10 and the work vehicle 14 described above and shown in FIG. 1. However, it should be appreciated that the disclosed system 200 may generally be utilized with any suitable implement having any suitable implement configuration and/or with any suitable work vehicle having any suitable vehicle configuration. Additionally, it should be appreciated that hydraulic or fluid couplings of the system 200 shown in FIG. 4 are indicated by solid lines. Similarly, communicative links or electrical couplings of the system 200 shown in FIG. 4 are indicated by dashed lines.

As shown, the system 200 includes both a vehicle controller 202 installed on and/or otherwise provided in operative association with the work vehicle 14 configured to tow the implement 10 and an implement controller 204 installed on and/or otherwise provided in operative association with the implement 10. In general, each controller 202, 204 of the disclosed system 200 may correspond to any suitable processor-based device(s), such as a computing device or any combination of computing devices. Thus, in several embodiments, the vehicle controller 202 may include one or more processor(s) 206 and associated memory device(s) 208 configured to perform a variety of computer-implemented functions, such as automatically controlling the operation of one or more components of the work vehicle 14. Similarly, as shown in FIG. 4, the implement controller 204 may include one or more processor(s) 210 and associated memory devices 212 configured to perform a variety of computer-implemented functions, such as automatically controlling the operation of one or more components of the implement 10.

It should be appreciated that, as used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 208, 212 of each controller 202, 204 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 208, 212 may generally be configured to store suitable computer-readable instructions that, when implemented by the processor(s) 206, 210 of each controller 202, 204, configure the controller 202, 204 to perform various computer-implemented functions, such as performing the various operations, control functions and/or control actions described herein and/or implementing one or more aspects of the method 400 described below with reference to FIG. 6. Additionally, it should be appreciated that, while the memory 208, 212 is shown as being an integral part of, or local to the controllers 202, 204, the memory 208, 212 may instead have any other configuration. For instance, in some embodiments, the memory 208, 212 may be positioned remotely from the controller 202, 204, such that the controller 202, 204 may be configured to access computer-readable instructions and/or data stored in the memory 208, 212 via a wireless network connection (e.g., data stored on a cloud-based server).

In addition, each controller 202, 204 may also include various other suitable components, such as a communications circuit or module, a network interface, one or more input/output channels, a data/control bus and/or the like, to allow each controller 202, 204 to be communicatively coupled to the other controller and/or to any of the various other system components described herein. For instance, as shown in FIG. 4, a communicative link or interface 214 (e.g., a data bus) may be provided between the vehicle controller 202 and the implement controller 204 to allow the controllers 202, 204 to communicate with each other via any suitable communications protocol. Specifically, in one embodiment, an ISOBus Class 3 (ISO 11783) interface may be utilized to provide a standard communications protocol between the controllers 202, 204. Alternatively, a proprietary communications protocol may be utilized for communications between the vehicle controller 202 and the implement controller 204.

As shown in FIG. 4, the vehicle controller 202 may be communicatively coupled to one or more valve assemblies, such as the valve assembly(ies) 94 described above with reference to FIG. 1, to regulate the supply of hydraulic fluid from a pump and associated fluid tank or supply, such as the pump 96 and the fluid supply 98 described above with reference to FIG. 1 located on the work vehicle 14. Based on control signals from the vehicle controller 202 (which may, in certain instances, be initiated by the implement controller 204 and/or an operator of the work vehicle 14), the valve assembly(ies) 94 may regulate the supply of hydraulic fluid from the fluid supply 98 to various implement-based actuators of the implement 10 (e.g., the wing actuators 42, 44, the transport wheel actuators 74-84, and the gauge wheel actuators 90, 92), such as by restricting or enabling fluid flow from the fluid supply 98 into the respective actuators via one or more hydraulic lines, such as via a first supply line 216 or a second supply line 218. Alternatively, the implement controller 204 may be configured to override the vehicle controller 202 and may directly control the supply of hydraulic fluid through the valve assembly(ies) 94.

In the embodiment shown in FIG. 4, each of the wing actuators 42, 44 is configured as a hydraulic cylinder having a piston 421 with an associated connector rod 421A, with the piston 421 separating a rod side 42A, 44A and a cap side 42B, 44B of the respective hydraulic cylinder. As fluid is supplied to the rod side 42A, 44A of one or more of the actuator(s) via the first supply line 216, the actuator(s) retracts to move the corresponding wing section(s) 28, 30, 32, 34 towards its transport position (with return fluid from the opposed cap side 42B, 44B of such actuator(s) being returned via the second supply line 218). Similarly, as fluid is supplied to the cap side 42B, 44B of one or more of the actuator(s) via the second supply line 218, the actuator(s) extends to move the move the corresponding wing section(s) 28, 30, 32, 34 towards its fully extended position (with return fluid from the opposed rod side 42A, 44A being released through a drain circuit 219). Thus, by controlling the operation of the valve assembly(ies) 94 to regulate the supply of hydraulic fluid through the supply lines 216, 218, the actuators 42, 44 may be extended or retracted to correspondingly extend or retract the associated wing sections 28, 30, 32, 34. It should be appreciated that the connection between the supply lines 216, 218 and the actuators 42, 44 may be instead configured such that supply of hydraulic fluid through the first supply line 216 causes extension of the actuators 42, 44 and the supply of hydraulic fluid through the second supply line 218 causes retraction of the actuators 42, 44.

As shown in FIG. 4, the hydraulic system 200 further includes a folding valve 220 coupled between each respective rod side 42A, 44A of the actuators 42, 44 and the first supply line 216. For example, a first folding valve 220(1) is fluidly coupled between the first supply line 216 and the rod side 44A of the outer wing actuator 44 configured to actuate the right outer-wing section 32, a second folding valve 220(2) is fluidly coupled between the first supply line 216 and the rod side 42A of the inner wing actuator 42 configured to actuate the right inner-wing section 28, a third folding valve 220(3) is fluidly coupled between the first supply line 216 and the rod side 42A of the inner wing actuator 42 configured to actuate the left inner-wing section 30, and a fourth folding valve 220(4) is fluidly coupled between the first supply line 216 and the rod side 44A of the outer wing actuator 44 configured to actuate the left outer-wing section 34. Each folding valve 220 may further be communicatively coupled to the implement controller 204 via a respective communication line 222. For example, the first folding valve 220(1) is communicatively coupled to the implement controller 204 via a first communication line 222(1), the second folding valve 220(2) is communicatively coupled to the implement controller 204 via a second communication line 222(2), the third folding valve 220(3) is communicatively coupled to the implement controller 204 via a third communication line 222(3), and the fourth folding valve 220(4) is communicatively coupled to the implement controller 204 via a fourth communication line 222(4).

In several embodiments, each folding valve 220 may be configured as an "on/off" valve actuatable between an "on" or opened position and an "off" or closed position (e.g., by automatically controlling the operation of each valve 220 via the implement controller 204). When each folding valve 220 is moved to its "opened" position, hydraulic fluid supplied through the first supply line 216 is allowed to pass through the folding valve 220 to its respective actuator 42, 44 at a pressure equal or substantially equal to the supply pressure of the fluid from the valve assembly 94. As such, when a respective folding valve 220 is actuated to its "opened" position while fluid is being directed from the valve assembly 94 through the first supply line 216, the corresponding actuator 42, 44 may be retracted, thereby causing the associated wing section 28, 30, 32, 34 of the implement 10 to be actuated towards its transport position. Similarly, when each folding valve 220 is moved to its "closed" position, the supply of pressurized fluid to the rod side 42A, 44A of the associated actuator 42, 44 is cut-off. In such instance, when the wing sections 28, 30, 32, 34 are at their fully extended position, the wing sections 28, 30, 32, 34 may be allowed to float during operation of implement 10.

Additionally, the hydraulic system 200 may further include one or more leveling valves configured to regulate the flow rate and/or pressure of the hydraulic fluid being supplied to the various implement-based actuators. For example, in the embodiment of the system 200 shown in FIG. 4, the leveling valves are configured as pressure regulating valves 224. In this regard, the leveling valves will be referred to hereafter as "pressure regulating valves 224" for the sake of simplicity and without intent to limit. The one or more pressure regulating valve(s) 224 are configured to regulate the flow rate and/or supply pressure of the hydraulic being supplied to the outer-wing actuators 44 via the first supply line 216. In such embodiment, each pressure regulating valve 224 may be coupled in parallel with a respective one of the folding valves 220 between the respective rod side 44A of the outer-wing actuators 44 and the first supply line 216. For example, a first pressure regulating valve 224(1) is fluidly coupled in parallel with the first folding valve 220(1) between the first supply line 216 and the rod side 44A of the outer wing actuator 44 configured to actuate the right outer-wing section 32, and a second pressure regulating valve 224(4) is fluidly coupled in parallel with the fourth folding valve 220(4) between the first supply line 216 and the rod side 44A of the outer wing actuator 44 configured to actuate the left outer-wing section 34. It should be appreciated that, while not shown, in some embodiments, the system 200 may further include pressure regulating valve(s) 224 between each of the inner wing actuators 42 and the first supply line 216.

In several embodiments, each pressure regulating valve 224 corresponds to a spring-biased, pilot-operated two-position valve, actuatable between an opened position 226 (as in FIG. 4) and a closed or return position 228. In such embodiments, as shown in FIG. 4, a pilot line 230 may be fluidly coupled downstream of and between each pressure regulating valve 224 and its respective folding valve 220 such that the pilot line 230 receives a portion of any hydraulic fluid flowing through the respective folding valve 220. For example, a first pilot line 230(1) may be downstream of and between the associated pressure regulating valve 224(1) and folding valve 220(1), and a second pilot line 230(4) may be downstream of and between the associated pressure regulating valve 224(4) and folding valve 220(4).

Thus, when the folding valves 220 are actuated to their opened positions and pressurized hydraulic fluid is being supplied through both the first supply line 216 and the folding valve(s) 220, a portion of the pressurized hydraulic fluid may be diverted through the associated pilot line 230 to bias or actuate the corresponding pressure regulating valve 224 (e.g., against the biasing force of an associated spring 232) into its closed or return position 228. Additionally, when pressurized hydraulic fluid is being supplied to the cap sides 44B of the actuators 44 via the second supply line 218 and the folding valves 220 are closed, the pressure regulating valves 224 may be similarly biased into their closed or return positions 228 such that the rod sides 44A of the actuators 44 are in fluid communication with the respective drain circuits 119 to allow hydraulic fluid to be returned through a corresponding drain valve 221(1), 221(4) controlled by the implement controller 204 (via a communication link 222A, 222B). However, when the folding valves 220 are actuated to their closed positions and pressurized hydraulic fluid is being supplied through the first supply line 216, each pressure regulating valve 224 may be biased into its opened position 226 via the biasing action of the associated spring 232.

In some embodiments, the operation or pressure setting of each pressure regulating valve 224 may be varied to adjust the output pressure or "leveling pressure" supplied to the respective actuators 44 from each valve 224 when in its opened position. For example, the biasing force provided by each spring 232 may be manually adjusted by an operator of the implement 10 to adjust the output pressure or pressure setting of each pressure-regulating valve 224. Alternatively, the operation of the pressure regulating valves 224 may be automatically controlled (e.g., via the implement controller 204) to adjust the output pressure or pressure setting of each pressure-regulating valve 224.

In accordance with aspects of the present subject matter, when it is desired to adjust the orientation of each outer-wing section 32, 34 relative to its respective inner-wing section 28, 30, such as when the outer-wing section 32, 34 is in its fully extended position and is not substantially level with the respective inner wing section 28, 30 (e.g. the out-of-level orientation shown in FIG. 3A), the implement controller 204 may be initially configured to confirm that the folding valves 220 are closed. In the event the folding valves 220 are opened, the controller 204 may be configured to transmit suitable control signals (e.g., via communicatively links 222) to cause the folding valves 22 to be closed. Thereafter, the operation of the valve assembly 94 may be controlled to allow hydraulic fluid to be supplied through the first supply line 216 to the pressure regulating valves 224 at a given supply pressure, which may, in turn, be configured to reduce the pressure of the hydraulic fluid supplied to the rod side 44A of each actuator 44 to a "leveling pressure" corresponding to a selected fluid pressure at which the actuators 44 will be retracted a sufficient amount to cause the corresponding outer-wing sections 32, 34 of the implement 10 to be actuated into their desired orientation relative to the respective inner-wing section 28, 30 (e.g., the substantially level orientation shown in FIG. 3B).

It should be appreciated that the selected leveling pressure may generally vary depending on number factors, including, but not limited to, the configuration of the implement 10, the conditions of the field in which the implement 10 is operating, the operational settings for the implement 10 (e.g., penetration depth, etc.), and/or the like. Thus, as indicated above, the output pressure setting for each of the pressure regulating valves 224 may be adjusted (e.g., manually or automatically) to vary the leveling pressure supplied to the outer wing actuators 44. For instance, the pressure regulating valves 224 may be initially set so as to supply hydraulic fluid at an initial leveling pressure to the actuators 44. If it is determined that the initial leveling pressure is insufficient to cause the desired adjustment in the orientation of the outer-wing sections 32, 34, relative to the inner-wing sections 28, 30 (e.g., the pressure is too low to result in sufficient retraction of the actuators 44), the pressure setting for the pressure regulating valves 224 may be adjusted to increase the leveling pressure. In contrast, if it is determined that the initial leveling pressure is too high (e.g., the supplied pressure results in too great a retraction of the actuators 44), the pressure setting for the pressure regulating valves 224 may be adjusted to reduce the leveling pressure.

It should be appreciated that, in some embodiments, a situation might occur where the orientation of only one of the outer-wing sections 32, 34 needs to be adjusted with respect to its corresponding inner-wing section 28, 30. In such embodiment, the system 200 may be configured such that the pressure regulating valves 224 may be selectively or individually supplied fluid pressure via the first supply line 216.

Additionally, in one embodiment, the implement controller 204 may be configured to execute the disclosed hydraulic leveling of the outer-wing sections 32, 34 relative to the inner-wing sections 28, 30 based on an input received from an operator. For example, the operator may monitor the relative orientation of the outer-wing sections 32, 34 to the inner-wing sections 28 during the performance of an agricultural operation, 30, such as by visually monitoring the orientation of the outer-wing sections 32, 34 out the back of the work vehicle 14 or by monitoring the measurements from one or more of the level sensors 118, 120, 122, 124, 126 via a display provided in the cab of the work vehicle 14.

If it is determined that the outer-wing section(s) 32, 34 is not substantially level with the inner-wing section 28, 30, the operator may provide an input to the implement controller 204 (e.g., via a user interface 234 provided within the cab) indicating that the outer-wing sections 32, 34 are not substantially level with the inner-wing sections 28, 30. The implement controller 204 may then be configured to initiate control of the operation of the valve assembly 94 (e.g., by directly controlling the operation of the valve assembly 94 or by transmitting a request to the vehicle controller 202 to control the operation of the valve assembly 94) in order to supply hydraulic fluid through the first supply line 116 to the pressure-regulating valve(s) 224 while the folding valve(s) 220 are in their closed positions to allow the orientation of the outer-wing sections 32, 34 to be adjusted, as desired.

In another embodiment, the implement controller 204 may be configured to automatically execute the disclosed hydraulic leveling of the outer-wing sections 32, 34 relative to the inner-wing sections 28, 30 based on one or more inputs received from associated sensors of the implement 10. For example, the implement controller 204 may be in communication with one or more of the level sensors 118, 120, 122, 124, 126 described above such that the implement controller 204 is configured to receive measurements or sensor data provided by the level sensors 118, 120, 122, 124, 126. In such an embodiment, the implement controller 204 may be configured to process the sensor data received from the level sensors 118, 120, 122, 124, 126 to determine the positioning of the outer-wing sections 32, 34 relative to the corresponding inner-wing sections 28, 30. For instance, based on the sensor data, the implement controller 204 may be configured to monitor the angular position of the outer-wing sections 32, 34 relative to the corresponding inner-wing sections 28, 30. The controller may then compare the monitored angular position of each outer-wing section 32, 34 to a desired or reference angular position for the outer-wing sections 32, 34 to determine when the outer-wing sections 32, 34 are out-of-level relative to the inner-wing sections 28, 30, particularly when the frames 60, 62 of the outer-wing sections 32, 34 are out-of-level relative to the frame members 52, 54. If it is determined based on the sensor data that the outer-wing sections are not at the desired orientation relative to the inner-wing sections 28, 30, the implement controller 204 may automatically initiate control of the operation of the valve assembly 94 such that hydraulic fluid is supplied through the first supply line 116 to the pressure-regulating valve(s) 224 to cause the outer-wing sections 32, 34 to be actuated relative to the inner-wing sections 28, 30. In addition, the implement controller 204 may be configured to continuously or periodically monitor the position of the outer-wing sections 32, 34 following the adjustment to allow further adjustments to be made, if necessary, in order to maintain the outer-wing sections 32, 34 at the desired orientation relative to the inner-wing sections 28, 30 substantially throughout the operation of the implement 10.

More particularly, in an embodiment where the level sensors 118, 120, 122, 124, 126 are configured to measure the independent inclination angle of each respective frame section 26, 28, 30, 32, 34, the implement controller 204 may be configured to compare the measured inclination angle of the outer-wing section 32, 34 to the measured inclination angle of the inner-wing section 28, 30. If the measured inclination angle of the outer-wing section 32, 34 is within a certain number of degrees of the measured inclination angle of the inner-wing section 28, 30, it may be determined that the outer-wing section 32, 34 is substantially level with the inner-wing section 32, 34. For example, in one embodiment, if the measured inclination angle of the outer-wing section 32, 34 is within about 10 degrees of the measured inclination angle of the inner-wing section 28, 30, the outer-wing section 32, 34 is substantially level with the inner-wing section 32, 34.

Alternatively, in an embodiment where the level sensors 118, 120, 122, 124, 126 are configured to directly measure an angle between adjacent frame or wing sections, the implement controller 204 may be configured to compare the measured angle between the outer-wing section 32, 34 and the inner-wing section 28, 30 with an acceptable range of angles corresponding to positions where the outer-wing section 32, 34 is substantially level with the inner-frame section 28, 30. For example, in one embodiment, if the measured angle between the inner and outer wing sections 28, 30, 32, 34 is within a range of about 170 degrees to about 190 degrees, it may be determined that the outer-wing section 32, 34 is substantially level with the inner-wing section 32, 34.

It should be appreciated that the example angular ranges described above are provided merely for the purposes of discussion and should not be construed as limiting. Instead, it is understood that any suitable angular range may be chosen such that the ground-engaging tools, e.g., discs 50, evenly engage the ground surface 152 across the entire width of the implement 10 to provide for consistent working of the soil and/or to prevent excessive wear on the tools or associated frame sections.

Figure 5:
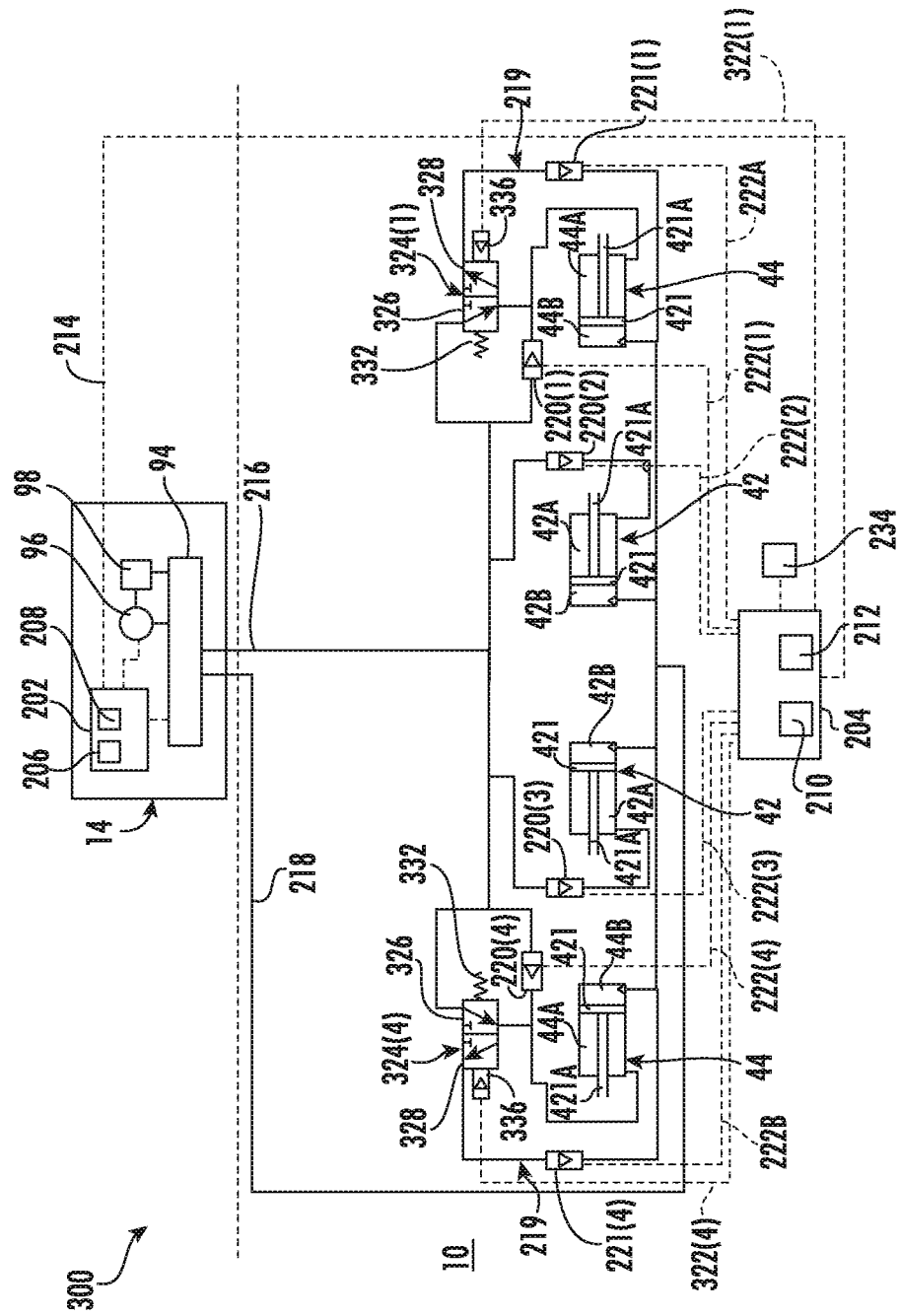
FIG. 5 illustrates a schematic view of another embodiment of a system for automatically leveling a multi-wing agricultural implement in accordance with aspects of the present subject matter.

Referring now to FIG. 5, a schematic view of another embodiment of a system 300 for hydraulically leveling a multi-wing agricultural implement is illustrated in accordance with aspects of the present subject matter. For purposes of discussion, the system 300 will be described herein with reference to the implement 10 and the work vehicle 14 described above and shown in FIG. 1. However, it should be appreciated that the disclosed system 300 may generally be utilized with any suitable implement having any suitable implement configuration and/or with any suitable work vehicle having any suitable vehicle configuration.

In the embodiment illustrated in FIG. 5, the system 300 is generally configured the same as or similar to the system 200 described above with reference to FIG. 4. However, unlike the spring-biased, pilot-operated pressure regulating valves 224 of the system 200 of FIG. 5, the system 300 includes pressure regulating valves 324 configured as solenoid operated valves. Specifically, the system 300 includes a first solenoid-operated pressure regulating valve 324(1) fluidly coupled in parallel with the first folding valve 220(1) between the first supply line 216 and the outer wing actuator 44 configured to actuate the right outer-wing section 32, and a second solenoid-operated pressure regulating valve 324(4) fluidly coupled in parallel with the fourth folding valve 220(4) between the first supply line 216 and the outer wing actuator 44 configured to actuate the left outer-wing section 34. Similar to the spring-biased, pilot-operated valves 224 described above, each solenoid-operated pressure regulating valve 324 includes an opened or return position 326, a closed position 328, and a spring 332 configured to bias the respective pressure regulating valve 324 to the opened position 326).

As shown in FIG. 5, each solenoid-operated pressure regulating valve 324 generally includes an actuating mechanism, such as a solenoid 336. In such an embodiment, each solenoid 336 may be configured to receive one or more signals, i.e., a control inputs, from the implement controller 204 via a communication link 322(1), 322(4). Upon receiving suitable control inputs from the implement controller 204, the solenoid 336 may be configured to actuate the respective pressure regulating valve 324 between its opened position 326 (as shown in FIG. 5) and its closed position 328. As a result, by controlling the solenoids 336, the implement controller 204 may be configured to automatically adjust the output pressure settings for the pressure regulating valves 324, thereby regulating the leveling pressure supplied to the actuator 44. In such an embodiment, the implement controller 204 may be configured to automatically adjust the output pressure settings based on sensor data received from the level sensors and/or based on inputs received from the operation. For instance, the operator may be provided with a suitable input device (e.g., buttons, a control knob, etc.) within the cab that allows him/her to provide an input instructing the controller 204 to increase or decrease the output pressure setting for the valves 324.

Figure 6:
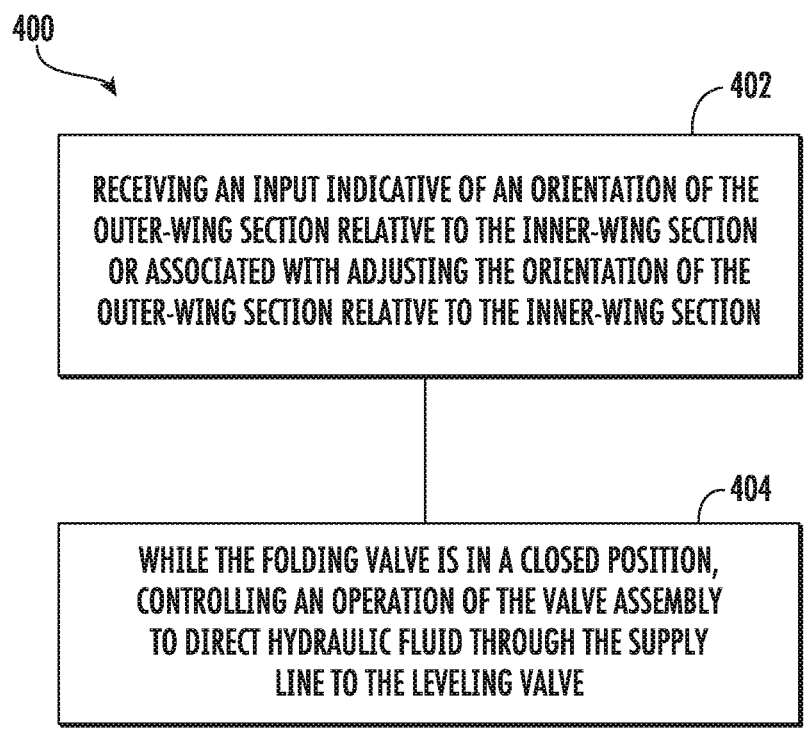
FIG. 6 illustrates a flow diagram of one embodiment of a method for automatically leveling a multi-wing agricultural implement in accordance with aspects of the present subject matter.

Referring now to FIG. 6, a flow diagram of one embodiment of a method 400 for hydraulically leveling a multi-wing agricultural implement is illustrated in accordance with aspects of the present subject matter. In general, the method 400 will be described herein with reference to the implement 10 shown in FIGS. 1-3 as well as the respective systems 200, 300 shown in FIGS. 4 and 5. However, it should be appreciated that the disclosed method 400 may be executed with implements having any other suitable configurations and/or with systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined and/or adapted in various ways without deviating from the scope of the present disclosure.

As shown in FIG. 6, at (402), the method 400 may include receiving, with a computing device, an at least one input indicative of an orientation of the outer-wing section relative to the inner-wing section or associated with adjusting the orientation of the outer-wing section relative to the inner-wing section. For example, as indicated above, an input or signal may either be an input generated by the user's interaction with a user interface indicating that one or more of the outer-wing sections 32, 34 is sagging relative to the respective inner-wing section 28, 30 or an input of the one or more level sensors 118, 120, 122, 124, 126 corresponding to an angular position of the outer-wing section 32, 34 relative to the inner-wing section 28, 30.

Moreover, as (404), the method 400 may include, while the folding valve is in a closed position, controlling, with the computing device, an operation of the valve assembly to direct hydraulic fluid through the supply line to the leveling valve such to allow the hydraulic fluid to be supplied to the actuator at a selected leveling pressure less than the supply pressure in order to adjust the orientation of the outer-wing section relative to the inner-wing section. Specifically, as indicated above, a supply pressure of hydraulic fluid may be supplied through the first supply line 216 to the pressure regulating valve 224, 324 while the respective folding valve 220 is closed such that the supply pressure provided to the actuator 44 is reduced by the pressure regulating valve 224, 324 and the outer-wing section 32, 34 may be pivoted into a substantially level position relative to the inner-wing section 28, 30.

It is to be understood that the steps of the method 400 are performed by the implement controller 204 upon loading and executing software code or instructions which are tangibly stored on a tangible computer readable medium, such as on a magnetic medium, e.g., a computer hard drive, an optical medium, e.g., an optical disc, solid-state memory. e.g., flash memory, or other storage media known in the art. Thus, any of the functionality performed by the implement controller 204 described herein, such as the method 400, is implemented in software code or instructions which are tangibly stored on a tangible computer readable medium. The implement controller 204 loads the software code or instructions via a direct interface with the computer readable medium or via a wired and/or wireless network. Upon loading and executing such software code or instructions by the implement controller 204, the implement controller 204 may perform any of the functionality of the implement controller 204 described herein, including any steps of the method 400 described herein.

The term "software code" or "code" used herein refers to any instructions or set of instructions that influence the operation of a computer or controller. The) may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for hydraulically leveling a multi-wing agricultural implement, the system comprising:
    a central frame section;
    an inner-wing section pivotally coupled to the central frame section;
    an outer-wing section pivotally coupled to the inner-wing section;
    an actuator coupled between the inner-wing section and the outer-wing section, the actuator configured to actuate the outer-wing section between a transport position and a fully-opened position;
    a valve assembly configured to provide hydraulic fluid at a supply pressure to a supply line;
    a leveling valve fluidly coupled between the supply line and the actuator, the leveling valve having an opened position and a closed position, the leveling valve, when in the opened position, allowing the hydraulic fluid to be supplied to the actuator; and
    a folding valve fluidly coupled in parallel with the leveling valve between the supply line and the actuator, the folding valve, when in an opened position, allowing the hydraulic fluid to be supplied to the actuator such that the outer-wing section is actuated relative to the inner-wing section towards the transport position,
    wherein, when the folding valve is in a closed position and the hydraulic fluid begins being supplied through the supply line:
        the hydraulic fluid is prevented from being supplied to the actuator through the folding valve, and
        the leveling valve is movable to the opened position to allow the hydraulic fluid to be directed through the leveling valve at a selected leveling pressure less than the supply pressure to the actuator to maintain the outer-wing section at a desired orientation relative to the inner-wing section.

2. The system of claim 1, wherein, when the outer-wing section is in the desired orientation relative to the inner-wing section, the inner-wing section and the outer-wing section are substantially level relative to each other.

3. The system of claim 1, further comprising a controller configured to selectively actuate the folding valve between the opened and closed positions.

4. The system of claim 1, wherein the folding valve is an on/off valve and the leveling valve is a pressure regulating valve.

5. The system of claim 3, wherein the controller is further configured to control the operation of the leveling valve to adjust the selected leveling pressure at which the hydraulic fluid is supplied to the actuator when the folding valve is at closed position.

6. The system of claim 5, further comprising at least one sensor configured to measure an angular position of the outer-wing section relative to the inner-wing section, the controller being configured to control the operation of the leveling valve to adjust the selected leveling pressure based on sensor data received from the at least one sensor.

7. The system of claim 3, wherein, when it is determined that the outer-wing section is not substantially level with the inner-wing section, the controller is configured to initiate control of an operation of the valve assembly such that the hydraulic fluid is supplied through the supply line to the leveling valve while the folding valve is at the closed position.

8. The system of claim 1, wherein the actuator is a piston having a cylinder and a rod, the rod being slidably receivable within the cylinder between a fully retracted position and a fully extended position, the rod being actuated towards the fully retracted position when actuating the outer-wing section towards the transport position.

9. The system of claim 8, wherein the leveling valve is configured to allow the hydraulic fluid to be supplied to the actuator such that the rod is actuated towards the fully retracted position to maintain the outer-wing section at the desired orientation relative to the inner-wing section.

10. The system of claim 1, wherein the leveling valve is manually adjustable or electronically actuatable.

11. A method for hydraulically leveling a multi-wing agricultural implement, the multi-wing agricultural implement having a central frame section, an inner-wing section pivotally coupled to the central frame section, an outer-wing section pivotally coupled to the inner-wing section, and an actuator coupled between the inner-wing section and the outer-wing section, a supply line of the agricultural implement being in fluid communication with a valve assembly configured to provide hydraulic fluid at a supply pressure to the supply line, the agricultural implement further including a leveling valve fluidly coupled between the supply line and the actuator, and a folding valve fluidly coupled in parallel with the leveling valve between the supply line and the actuator, the method comprising:

receiving, with a computing device, an input indicative of an orientation of the outer- wing section relative to the inner-wing section or associated with adjusting the orientation of the outer-wing section relative to the inner-wing section; and while the folding valve is in a closed position, controlling, with the computing device, an operation of the valve assembly to begin directing hydraulic fluid through the supply line to the leveling valve, the leveling valve being movable to an opened position to allow the hydraulic fluid to be supplied through the leveling valve at a selected leveling pressure less than the supply pressure to the actuator in order to adjust the orientation of the outer-wing section relative to the inner-wing section, and the hydraulic fluid being prevented from being supplied to the actuator through the folding valve.

12. The method of claim 11, wherein the orientation of the outer-wing section is adjusted towards a desired orientation at which the inner-wing section and the outer-wing section are substantially level relative to each other.

13. The method of claim 11, wherein the input corresponds to an input received from an operator.

14. The method of claim 13, wherein the input is associated with a request from the operator to adjust the orientation of the outer-wing section relative to the inner-wing section.

15. The method of claim 11, wherein the input is received from at least one sensor configured to detect an angular position of the outer-wing section relative to the inner-wing section.

16. The method of claim 15, further comprising comparing, with the computing device, the detected angular position to a desired angular position, the desired angular position corresponding to a desired orientation of the outer-wing section relative to the inner-wing section, and wherein controlling the operation of the valve assembly comprises controlling the operation of the valve assembly to direct the hydraulic fluid to the leveling valve when it is determined that the outer-wing section is not located at the desired orientation based on the comparison between the detected angular position and the desired angular position.

17. The method of claim 11, further comprising controlling, with the computing device, the operation of the leveling valve to adjust the selected leveling pressure.

18. The method of claim 17, wherein controlling the operation of the leveling valve comprises controlling the operation of the leveling valve to adjust the selected leveling pressure based on the input.

19. The method of claim 11, further comprising controlling, with the computing device, an operation of the folding valve such that the folding valve is actuated to the closed position simultaneous with or prior to the hydraulic fluid being supplied through the supply line to the leveling valve for delivery to the actuator at the selected leveling pressure.

20. The method of claim 11, wherein, when the folding valve is in the closed position, the hydraulic fluid supplied to the actuator from the leveling valve at the selected leveling pressure causes a rod of the actuator to retract relative to a cylinder of the actuator to adjust the orientation of the outer-wing section relative to the inner-wing section.

* * * * *